Oct. 24, 1933.  G. CAUDILL  1,932,303
RAISING AND LOWERING DEVICE
Filed Oct. 24, 1932  2 Sheets-Sheet 1
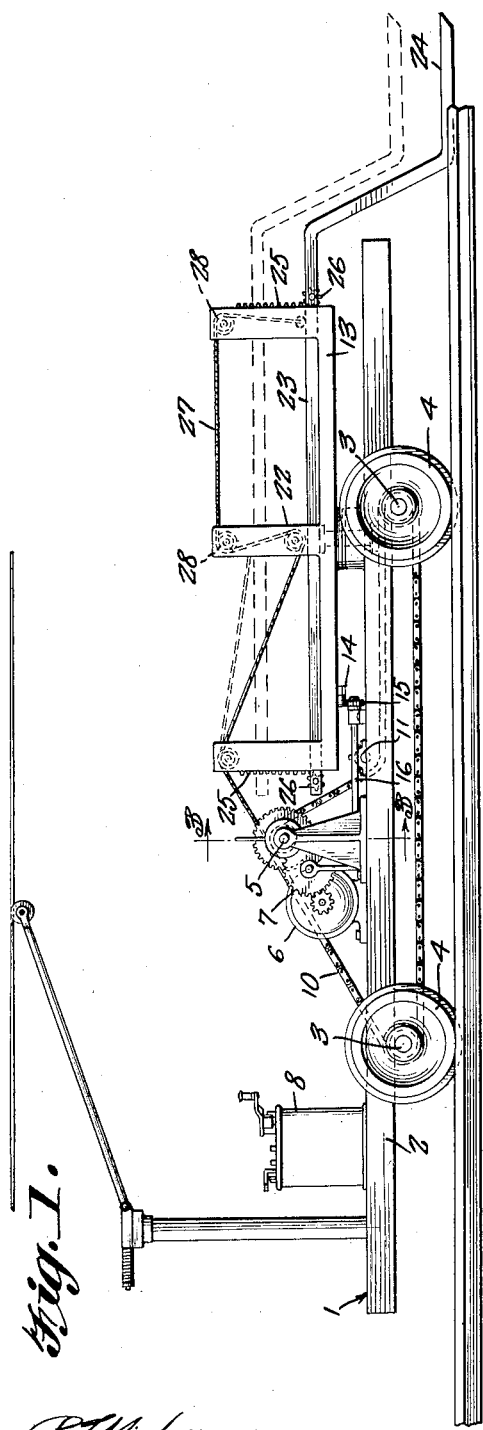
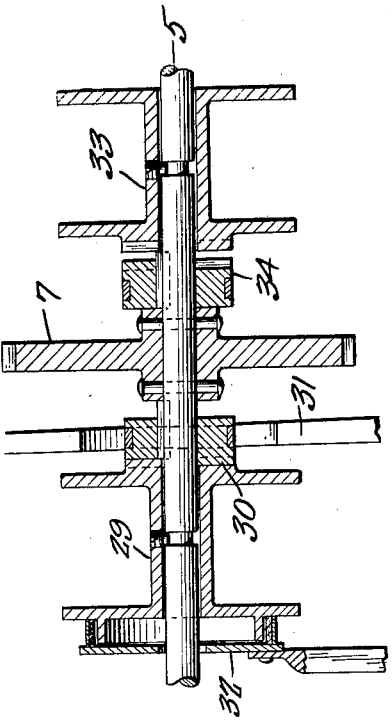
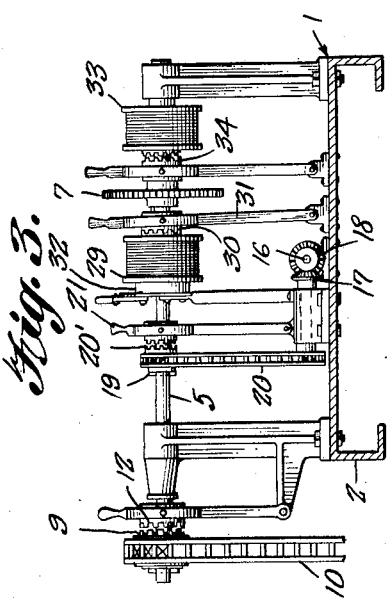
Granvil Caudill,
INVENTOR
BY Victor J. Evans & Co.
ATTORNEY Oct. 24, 1933.　　　　G. CAUDILL　　　　1,932,303
RAISING AND LOWERING DEVICE
Filed Oct. 24, 1932　　　2 Sheets-Sheet 2
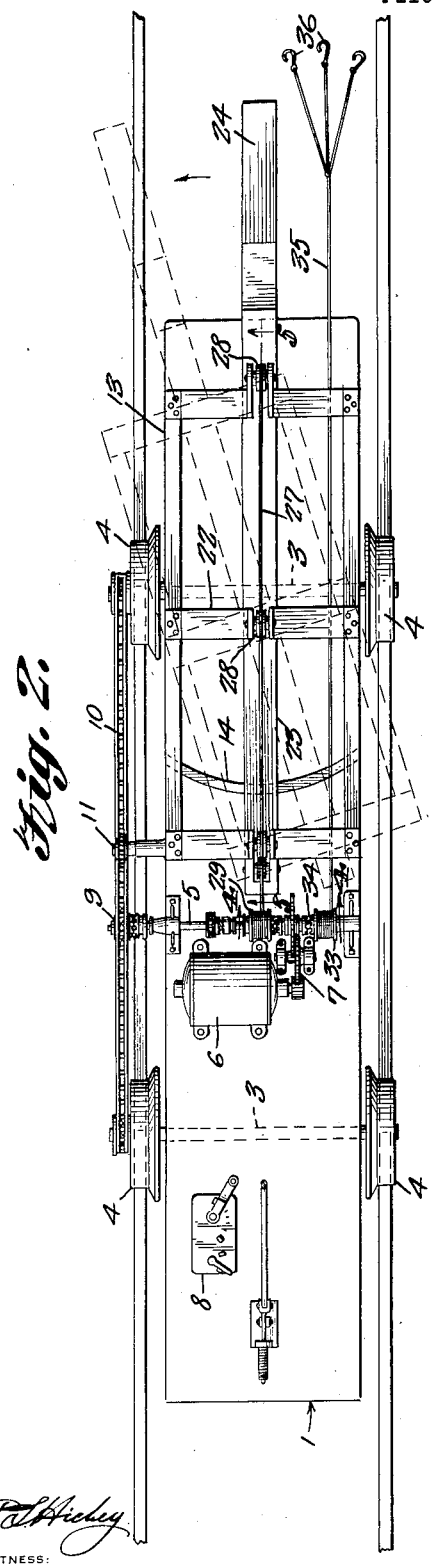
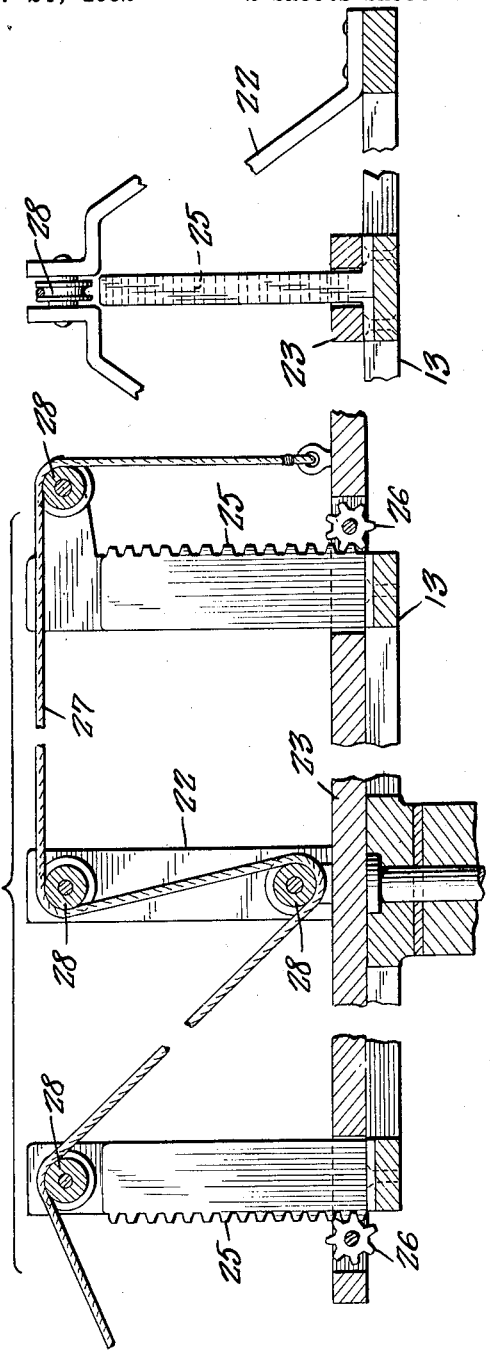
Granvil Caudill,
INVENTOR
BY Victor J. Evans & Co.
ATTORNEY
WITNESS:

Patented Oct. 24, 1933

1,932,303

UNITED STATES PATENT OFFICE 1,932,303

RAISING AND LOWERING DEVICE

Granvil Caudill, Wheelwright, Ky.

Application October 24, 1932. Serial No. 639,389

1 Claim. (Cl. 214—65)

This invention relates to a raising and lowering device especially adapted for the handling of wrecked and derailed rolling stock and has for the primary object, the provision of a self-propelled car equipped with hoisting means and windlass whereby disabled rolling stock may be easily and quickly moved into position for placement on the tracks and conveniently hoisted and lowered to the tracks, thus rendering a large saving in time and expense in the handling of wreckage.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a raising and lowering device constructed in accordance with my invention.

Figure 2 is a top plan view illustrating the same.

Figure 3 is a transverse sectional view taken on the line 3—3 of Figure 1.

Figure 4 is a fragmentary sectional view illustrating cable operating drums and clutches therefor.

Figure 5 is a fragmentary vertical sectional view taken on the line 5—5 of Figure 2.

Figure 6 is a fragmentary transverse sectional view illustrating a portion of the hoisting means.

Referring in detail to the drawings, the numeral 1 indicates a car consisting of a platform 2 having axles 3 journaled thereto and to which are secured power wheels 4. A power shaft 5 is suitably mounted on the platform and is driven by an electric motor 6 through a series of gears 7 and the electric motor may receive electricity from any suitable source and has in circuit therewith a conventional type of controller 8 mounted on the forward portion of the platform. The drive shaft 5 carries a sprocket gear 9 over which a sprocket chain 10 is trained. The sprocket chain 10 passes over sprocket gears secured to the axles 3 and also an idler 11 mounted on the platform. A clutch 12 is provided between the sprocket gear 9 and the drive shaft so that the car may be propelled over the track by engaging the clutch 12 and operating the controller 8, the controller being of the type capable of reversing the rotation of the electric motor.

A table 13 is pivoted to the platform 2 so as to be swung at various angles to the platform and has secured thereto a segmental rack 14 meshing with a pinion 15 on a shaft 16. The shaft 16 is rotatably supported by the platform and is connected to a shaft 17 by gears 18. The drive shaft 5 is provided with a sprocket gear 19 over which a sprocket chain 20 is trained and the sprocket chain also passes about a sprocket gear secured to the shaft 17. A clutch 20' is provided between the sprocket gear 19 and the drive shaft and is controlled by a hand lever 21 so that on engaging the clutch, the table 13 may be swung relative to the platform. The table 13 carries uprights 22 slidably supporting a hoisting element 23 which projects rearwardly of the table 13 and platform 2 and terminates in a foot 24 for engagement with the device to be lifted. The uprights are provided with rack bars 25 meshing with pinions 26 on the lifting member 23. A cable 27 is connected to the lifting member 23 and passes over a series of pulleys 28 carried by the uprights and is secured to and wound on a drum 29 mounted on the drive shaft 5 and connected thereto by a clutch 30 controlled by a lever 31. The drum 29 is provided with a suitable brake 32 for holding the drum against rotation when declutched from the drive shaft. By winding the cable on the drum due to the rotation of the latter, the lifting member 23 may be elevated and with the foot 24 in engagement with an object the latter may be readily raised or elevated.

A drum 33 is mounted on the drive shaft 5 and is connected thereto by a clutch 34 and the drum has secured and wound thereon a cable 35 carrying at its free end hooks or similar grappling devices 36 whereby the cable 35 may be connected to a car or other object and then drawn towards the track and into a position for lifting onto the track by the raising element 23.

A device constructed in accordance with the foregoing may readily travel on a track under its own power and is capable of drawing to the track wreckage and then lifting the wreckage into position on the track or supporting said wreckage in such a way that it may be conveniently carried to any place selected.

While I have shown and described the preferred embodiment of my invention, it will be understood that minor changes in construction, combination and arrangement of parts may be made without departing from the spirit and scope of my invention, as claimed.

Having described the invention, I claim:

A raising and lowering device comprising a power propelled platform, a table pivoted to the platform for swinging movement about a vertical axis, spaced vertically arranged rack bars carried by the table, a horizontally disposed elevating member slidable on the rack bars, pinions journaled to the elevating member and meshing with the rack bars, intermediate and end brackets mounted on the table with their upper ends disposed over the elevating member and located in a plane above the upper ends of the rack bars, pulleys journaled to the upper ends of the end brackets, upper and lower pulleys journaled to the intermediate bracket and a hoisting cable trained over the upper and lower pulleys of the intermediate bracket in opposite directions and then over the pulleys of the end brackets and having one end secured to the elevating member and its other end connected to a power means.

his
GRANVIL  ✕  CAUDILL.
                      mark

Witnesses to mark:
C. B. HANGER.
L. M. RYAN.